April 9, 1963 F. J. MARKEY 3,084,535
BRAKE FLUID TESTING APPARATUS
Filed May 12, 1960 3 Sheets-Sheet 1

INVENTOR.
Francis J. Markey
BY
D. L. Staley
HIS ATTORNEY

April 9, 1963  F. J. MARKEY  3,084,535
BRAKE FLUID TESTING APPARATUS
Filed May 12, 1960  3 Sheets-Sheet 2

INVENTOR.
Francis J. Markey
BY
HIS ATTORNEY

April 9, 1963   F. J. MARKEY   3,084,535
BRAKE FLUID TESTING APPARATUS
Filed May 12, 1960   3 Sheets-Sheet 3
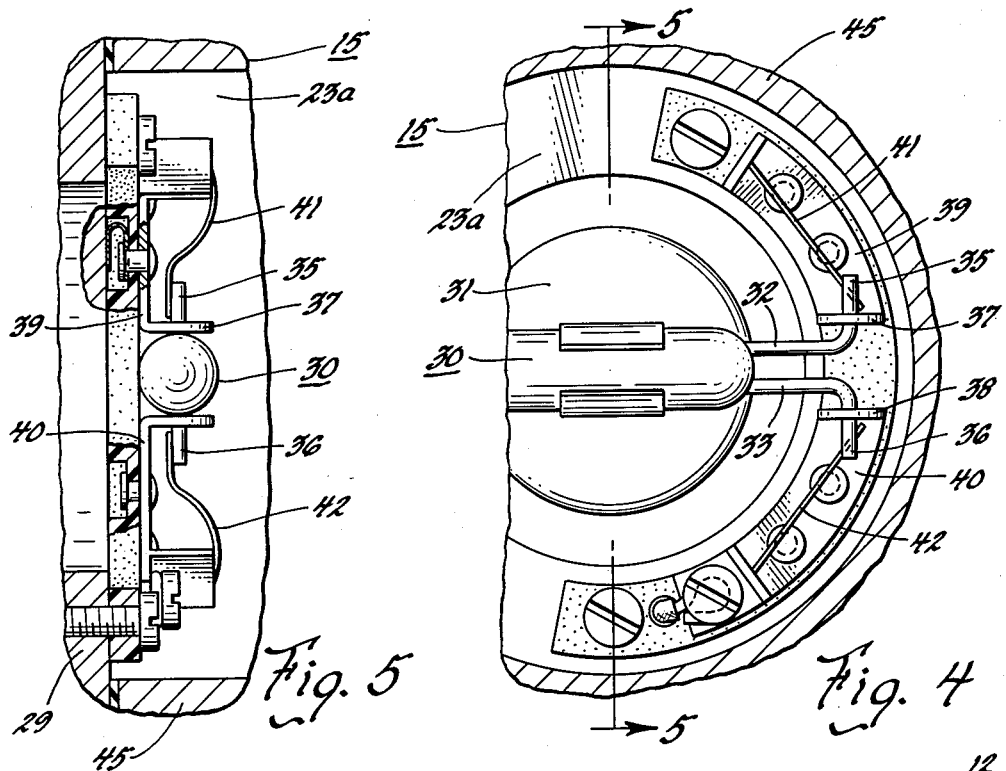
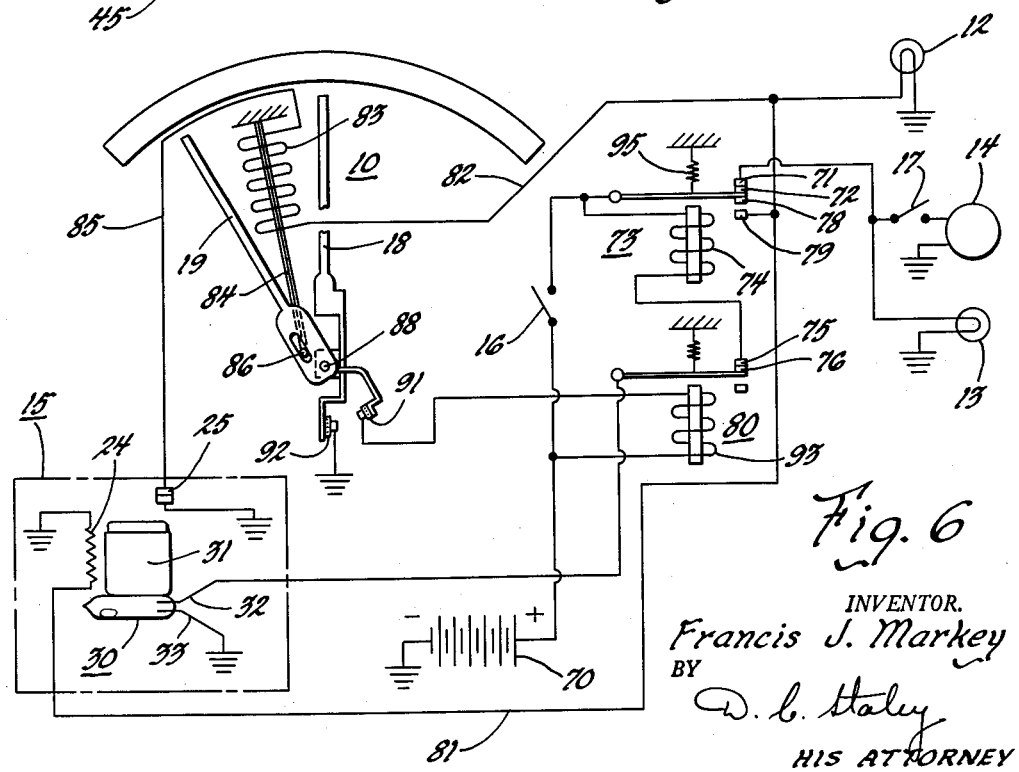
INVENTOR.
Francis J. Markey
BY
HIS ATTORNEY 3,084,535
BRAKE FLUID TESTING APPARATUS
Francis J. Markey, Lewisburg, Ohio, assignor to General Motors Corporation, Detroit, Mich., a corporation of Delaware
Filed May 12, 1960, Ser. No. 28,716
8 Claims. (Cl. 73—17)

This invention relates to apparatus for testing liquids to determine the boiling point of a liquid, that is to determine the temperature of the liquid at which gases are evolved from the liquid whether it be the result of a change of phase of the liquid as a result of boiling of the liquid, or whether it is evolution of gases from the liquid while it is still in the liquid state.

Because of the ever increasing requirement for more brake capacity on passenger vehicles, trucks, buses, etc., there is the increasing need to know the temperature at which brake fluid in the hydraulic brake system will boil or will have gases evolved from the liquid due to high-temperature operation of the brakes of the vehicle. It is commonly known that when the hydraulic wheel cylinder of a hydraulic brake on a vehicle exceeds the boiling point of the hydraulic fluid in the wheel cylinder, the liquid changes to its gaseous phase with the result that spongy or soft brake action is obtained. This gives inadequate braking effect on the vehicle because of the compressibility of the gases in the hydraulic wheel cylinders so that increased pressure applied by the operator to the master cylinder to increase the hydraulic pressure in the system merely produces additional compression of the gases in the wheel cylinder of the hydraulic brake system rather than increasing the applied braking force to stop the vehicle. Such conditions of vapor lock in the wheel cylinders of a hydraulic brake system, or even in one of the wheel cylinders of a hydraulic brake system, can and have resulted in serious accident.

In the interest of safety requirement for operating motor vehicles on the highway, it is necessary that an operator of a motor vehicle know the condition of the brake fluid in the hydraulic brake system so that preventative maintenance will insure the operator of the vehicle safe operation of the brake system.

There has been somewhat of a general assumption that when a hydraulic brake system is filled with a hydraulic brake fluid having a satisfactory high boiling point, the boiling point of the hydraulic brake fluid will remain relatively unchanged during the life of the vehicle and the operator of the vehicle need only to replace the brake fluid from time to time as the level of the brake fluid becomes low in the reservoir for the master cylinder of the hydraulic brake system. However, it has now been demonstrated for some period of time that the boiling point of the hydraulic brake fluid in a hydraulic brake system does not remain constant over an extended and unlimited period of time due to various factors, the most important of which is the fact that hydraulic brake fluids are hygroscopic, and will and do absorb moisture from the atmosphere. Even though the hydraulic brake system has no leak in the system, moisture will be absorbed by the hydraulic brake fluid due to a breathing action in the system by way of the vent opening in the master cylinder reservoir or through moisture seepage past the pistons of the wheel cylinders and the master cylinder of the hydraulic brake system.

The end result is that after hydraulic brake fluid has been used in a brake system for an extended period of time, there is sufficient moisture absorbed into the brake fluid that the boiling point of the brake fluid is considerably below its original boiling point, or at least the brake fluid contains sufficient moisture that under conditions of heating of the brake fluid in the wheel cylinders of the hydraulic brakes, the brake fluid will either boil with resultant forming of gases in the wheel cylinders or the moisture absorbed by the hydraulic brake fluid will be boiled off with the same end result of development of gas in the wheel cylinders of the hydraulic brakes. When this condition develops in a hydraulic brake system, the vehicle has unsafe brakes even though mechanically the brakes are functioning normally and the brake linings are in satisfactory condition.

There has been no way for brake service stations, or others desiring to check the condition of brake fluid, to quickly and satisfactorily determine the boiling point of brake fluid present in a hydraulic brake system so that the operator of the vehicle could be given a report on the condition of the brake fluid in the brake system.

The satisfactory condition of brake fluid with regard to its boiling point has become a major safety consideration to the extent that legislation has already been passed in several States and is being considered in others whereby the brake fluid in a brake system must be maintained at or above a minimum boiling point value in order to pass safety requirements. However, suitable testing and checking apparatus to quickly determine the boiling point of the brake fluid in a hydraulic brake system to augment the safety program of the several States has not been heretofore in existence.

It is therefore an object of this invention to provide an apparatus that is capable of quickly and satisfactorily checking and determining the boiling point of hydraulic brake fluids in the hydraulic brake system of a vehicle so that a report can be given to the operator of the vehicle within a period of two or three minutes, in fact could be given to the operator during the time required to fill the gasoline tank of the vehicle.

It is another object of the invention to provide apparatus for testing and checking the boiling point or vaporization point of a liquid, particularly the liquid in a hydraulic brake system, wherein the checking and testing device can be used directly upon the master cylinder reservoir of a hydraulic brake system to check and determine the boiling point of the hydraulic brake fluid in the master cylinder reservoir, and thereby advise the operator of the vehicle of the condition of the hydraulic brake fluid in regard to its boiling point or its vaporization point, and whether or not it is within the minimum safety temperature requirement.

It is still another object of the invention to provide apparatus for checking and testing the boiling point or vaporization point of liquids wherein a small amount of hydraulic brake fluid can be removed from a brake system on a vehicle and quickly and accurately checked to determine its boiling or vaporization point.

Another object of the invention is to provide a checking or testing device to determine the boiling point or vaporization point of a liquid wherein the gas vapors created by boiling or evolution of gas from the brake fluid is that which actuates the device to establish the temperature at which the liquid boiled or vaporized.

It is another object of the invention to provide apparatus for checking the boiling or vaporization point of a liquid wherein a closed chamber is adapted to be filled with the liquid to be tested, the chamber containing a float member which will normally maintain a signal system in a position to indicate a lack of boiling or vaporization of liquid so long as no vapor or gases form in the chamber containing the float element, but which float element is adapted to actuate a signal system to indicate gasification or vaporization of the liquid whenever gases form in the float containing chamber and also establish the temperature at which the liquid has boiled or vaporized causing a temperature indicating device to be maintained at a temperature that resulted in the boiling or vaporization of the liquid, a suitable electrical relay system being included in the control system for actuation and control of the temperature indicating device and the warning signal which indicates boiling or vaporization of the liquid.

Further objects and advantages of the present invention will be apparent from the following description, reference being had to the accompanying drawings wherein preferred embodiments of the present invention are clearly shown.

In the drawings:

FIG. 4 is a cross-sectional view of the device illustrated in FIG. 3 taken along line 4—4 of FIG. 3.

FIG. 5 is a cross-sectional view taken along line 5—5 of FIG. 4.

FIG. 6 is a schematic view illustrating an electric control system of the apparatus.

Figure 2:
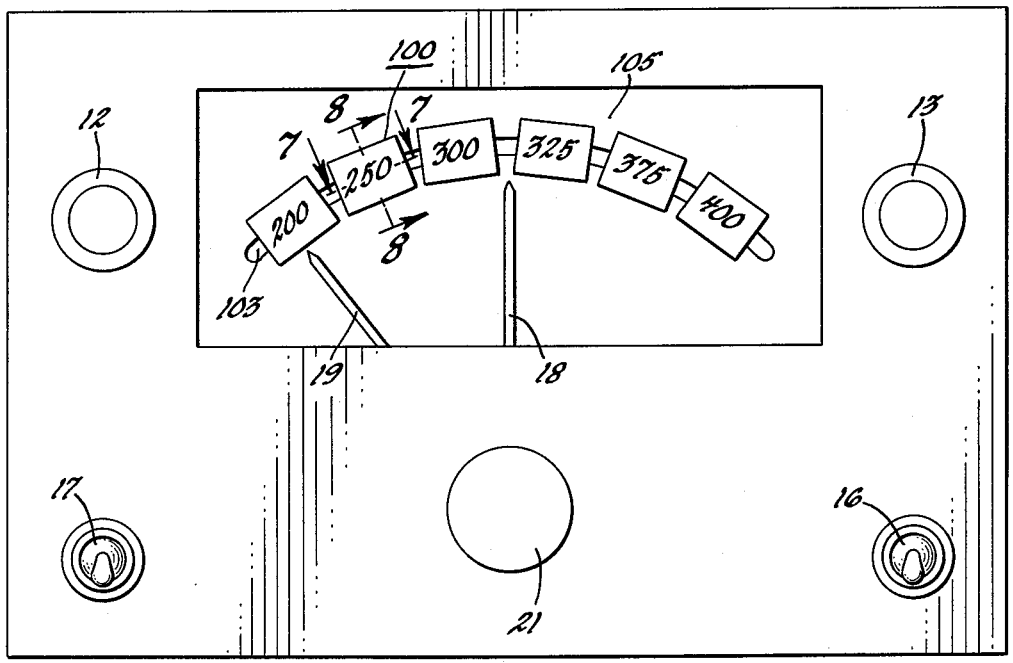
FIG. 2 is an enlarged view of the control panel and temperature indicating panel of the apparatus of this invention.
Figure 1:
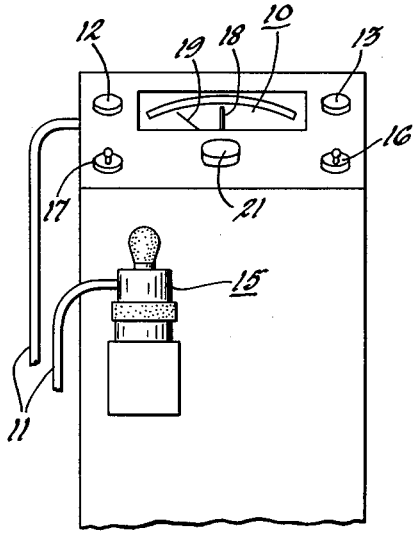
FIG. 1 is a partial front view of an apparatus incorporating features of this invention.

The apparatus of this invention consists of a temperature indicating device 10 that is suitably connected with a sensing device 15 that the temperature at which a liquid will boil or vaporize that is under test by the sensing device 15 will be relayed to the temperature indicating device 10 to indicate to the operator of the apparatus the temperature at which boiling or vaporization of the liquid under test is occurring. The sensing device 15 is constructed and arranged in a manner that it actuates an internal control in the device when gasification or vaporization of the liquid occurs in the sensing device. This control mechanism in the sensing device 15 actuates an electrical control or relay system to transmit the signal to the temperature indicating device 10 to establish the temperature at which gasification or vaporization of the liquid has occurred. The sensing device 15 is connected with the temperature indicating device 10 and with the electrical control and relay system for the same through the electric cable 11. The control system of the apparatus is more particularly shown in FIG. 6.

The sensing device 15 is adapted to have a closed chamber within the device filled with the liquid to be tested, in this case hydraulic fluid from a hydraulic brake system. So long as the liquid in the sensing device remains in a liquid condition, the only signal supplied to the temperature indicating device will be that to illuminate a green light 12 which indicates to the operator that the liquid under test is still in liquid condition and is therefore a safe liquid. So long as the sensing device 15 produces no other signal to be relayed to the temperature indicating device 10, the temperature indicating device will indicate the temperature of the liquid in the sensing device 15 until the safe predetermined minimum temperature is indicated on the temperature indicating device 10, at which time an alarm signal will be created by the temperature indicating device to tell the operator that the test is complete.

However, should the liquid in the sensing device 15 gasify or vaporize at a temperature below the satisfactory minimum safe temperature, the gas created in the closed chamber of the sensing device will operate a float actuated control to signal an alarm to the temperature indicating device 10 and at the same time hold the temperature indicating device at the temperature at which the liquid is gasifying or vaporizing, whereby to inform the operator of the unsafe condition of the liquid. The alarm signal for indicating the unsafe condition of the liquid includes a red light 13 and a buzzer alarm 14 connected electrically in parallel with the red light alarm 13.

A main control switch 16 is provided for turning the device on or off and a separate switch 17 is provided in the buzzer alarm circuit to cut out the buzzer if desired.

The maximum temperature to which the temperature indicating device will rise is controlled by a limit control hand 18, hereinafter more specifically disclosed and described.

The control panel of the temperature indicating device is more particularly illustrated in FIG. 2 wherein the red and green lights 12 and 13 are shown as well as the two control switches 16 and 17, as is the maximum limit control switches 16 and 17, as is the maximum limit control hand 18 and the temperature indicating hand 19, the limit control hand being adapted for manual actuation from the control knob 21.

Figure 3:
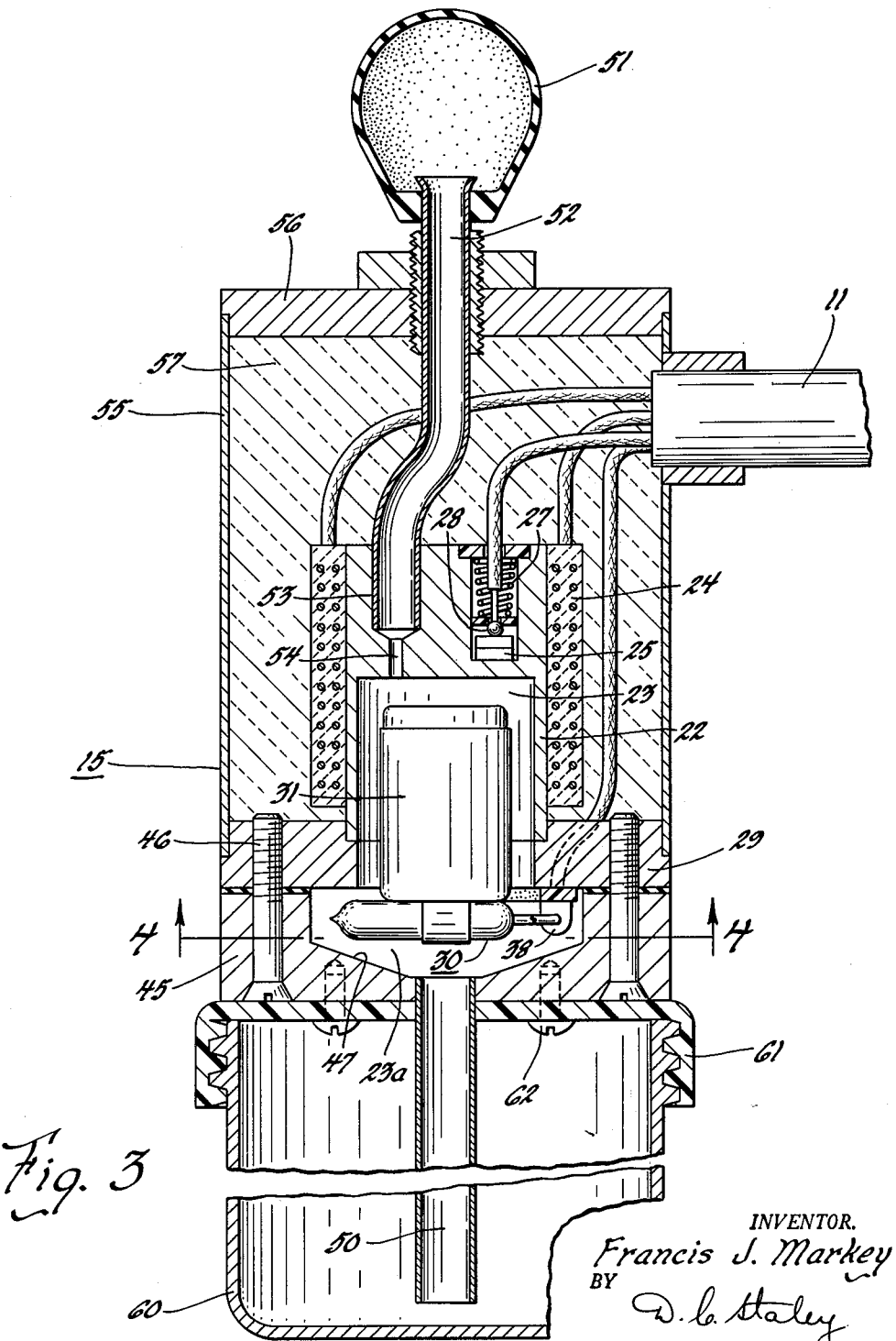
FIG. 3 is a vertical cross-sectional view of a device for establishing the boiling point of a liquid, which condition of the liquid can be relayed through a suitable relay system to the temperature indicating device and a warning signal system.

The sensing device 15 is more particularly illustrated in FIGS. 3, 4, and 5 and consists of a metal container 22 having a recess 23 forming a chamber in which liquid to be tested is received. The container 22 is surrounded with a heating element 24 to heat the container 22 as well as liquid contained within the chamber 23. The temperature of the container 22 is sensed by the thermistor disks 25 that are in thermal engagement with the container and are received in the opening 26 and retained in contact with the container by means of the compression spring 27 urging against the electric contact 28 that forms contact for the thermistor disks 25. The container 22 is connected to the opposite side of the electric circuit, as more particularly shown in FIG. 6, and hereinafter described. The thermistor disks are merely carbon disks whose resistance to electric current flow decreases as the temperature of the container 22 increases so that an electrically operated temperature indicating device can be operated by the change in current flow through the carbon resistance disks 25.

The lower end of the chamber 22 is attached to a radially extending mounting flange 29 that is preferably of electrical insulating material and has the mercury switch member 30 mounted for pivotal rotation on the mounting member 29. The mercury switch member 30 carries a float element 31 that responds to the level of liquid in the chamber 23 to open and close the mercury switch 30.

The mercury switch 30 has the two contact wires 32 and 33 extending from one end of the glass tube 34 of the switch 30, as more particularly shown in FIG. 4. These contact wires 32 and 33 have their end portions bent in the form of a right angle to provide the coaxially extending end portions 35 and 36. These end portions project through openings provided in the upstanding flange portions 37 and 38 respectively of the brackets 39 and 40 whereby the mercury switch 30 and the float element 31 are pivotally supported on the member 29 by the electric leads 32 and 33 of the mercury switch. This arrangement provides for maximum sensitivity of operation of the float member 31 with minimum friction of the pivot structure.

The contact wires 32 and 33 of the mercury tube switch 30 are engaged by the bronze spring wires 41 and 42 respectively with the wires lying against the periphery of the end portions 35 and 40 to eliminate any torque action on the mercury tube 30 and thereby eliminate torque action which would tend to affect the sensitivity of the action of the float 31. These spring wire members 41 and 42 are in turn rigidly connected with the bracket members 39 and 40 and thence through suitable wires to the electric control circuit more specifically described in connection with FIG. 6.

The chamber 23 of the container 22 is closed by the closure member 45 that receives the mercury tube switch 30. Suitable screw fasteners 46 are provided to contain the member 45 upon the member 29 and thereby establish a fully enclosed chamber consisting of the chamber 23 and the chamber portion 23a, the latter of which is formed by the recess 47 in the member 45.

A tube 50 extends downwardly from the chamber 23a through which liquid to be tested is drawn into the chamber 23—23a to subject the liquid to the heat of the heating element 24.

Liquid to be tested is drawn through the tube 50 by means of a rubber bulb element 51 that connects on the upper end of the tube 52, the lower end of which is received in an opening 53 in the chamber body 22 and thereby connects with the chamber 23 through the small vent opening 54. Obviously, compression of the rubber bulb 51 will first expel air from the chamber 23—23a and upon release of the rubber bulb, liquid into which the tube 50 is dipped will be drawn into the chamber 23—23a to fill the same completely with the liquid to be tested.

The upper end of the sensing device 15 is closed by a casing member 55 having a cover member 56 to which the tube 52 is attached, suitable heat insulating 57 being placed within the container 55.

The sensing device 15 is adapted to be used directly with the master cylinder reservoir of a vehicle merely by inserting the tube 50 into the master cylinder reservoir to draw a quantity of hydraulic brake fluid from the master cylinder reservoir up into the chamber 23—23a. However, if it is desired to test some of the brake fluid from a remote part of the system, such as the wheel cylinders, fluid can be bled from the wheel cylinders in conventional manner and then placed in a small can 60 that is held beneath the wall 45 by a threaded screw cap member 61 suitably attached to the wall 45 by the screws 62. Thus the sensing device can test any liquid desired at any remote place merely by inserting the liquid in the can 60 and then drawing the liquid into the chamber 23—23a.

The electric circuit connecting the sensing device 15 with the temperature indicating device 10 and the alarm circuit consisting of the green and red lights 12 and 13 and the alarm buzzer 14 is more particularly shown in FIG. 6. The electric circuit of FIG. 6 is illustrated as receiving its current supply from a battery because it is the purpose, in the use of the instrument, to utilize the battery of the motor vehicle having its brake fluid tested to provide the current necessary for control of the apparatus, the purpose of the apparatus being to place it alongside of the vehicle having the brake fluid tested so that the operator of the vehicle can observe the results of the test.

The electric circuit is illustrated under conditions wherein the float chamber 23 is empty so that the mercury tube switch 30 forms an open circuit. Under this condition, it will be noted that the buzzer 14 and the red light 13 can be energized from the battery 70 through the contacts 71 and 72 of the relay 73 when the main switch 16 is closed. However, when chamber 23 is filled with fluid in the manner heretofore described, float 31 will rise so as to close circuit across the contact wires 32 and 33 of the mercury tube switch 30. When this occurs, electric circuit is closed through the relay coil 74 of relay 73 and through relay contacts 75 and 76 of relay 80. When this occurs, relay coil 74, being energized, opens relay contacts 71 and 72 and closes relay contacts 78 and 79 whereby electric circuit is made to the heater 24 of the sensing device 15 through the electric line 81. Concurrently, circuit is made through electric line 82 through the heating coil 83 that is placed around a bimetal element 84 of the temperature indicating device 10 to the carbon resistance disks 25 through the electric line 85 whereby the amount of current flow through the heater coil 83 around the bimetal element 84 is in direct proportion to the temperature rise of the container 22, and thereby indicate the temperature of the container.

The bimetal member 84 operates the indicating hand 19 of temperature indicating device 10 through a small pin 86 carried on the lower end of the hand 19. The temperature indicating hand 19 and the maximum limit control hand 18 are both pivotally mounted on the common pivot 88 that is stationary to a fixed abutment. When the relay coil 74 is energized and circuit is made to the heater 24 and to the temperature indicating device as previously set forth, current is also supplied to the green light 12 through the line 90. Thus the green light will indicate that the instrument is in operation and that heat is being applied to the heater of the sensing device and to the temperature indicating device 10.

So long as there is no gasification of the liquid contained within the chamber 23, the green light 12 will remain lighted and the temperature indicating hand 19 will gradually rise until the contact 91 on the arm 19 engages the contact 92 on the arm 18 to close circuit through the relay coil 93 of relay 80 and thereby open circuit through the contacts 75 and 76. This will break circuit through the relay coil 74 of relay 73 to de-energize the coil and allow the contacts 71 and 72 to reclose as urged by the tension spring 95 which will again energize the electric circuit to the buzzer 14 and the red light 13. However, since the temperature indicating hand 19 has moved through its full stroke of setting as controlled by the position of the arm 18, the operator of the device, as well as the operator of the vehicle having fluid tested, will know that the liquid in the chamber 23 of the sensing device is still in liquid condition since the device has given no alarm previous to the time arm 19 indicates the temperature setting of the arm 18, which temperature has been set by the operator to that which is the normal minimum requirement for a safe brake fluid, and below which boiling of the brake fluid indicates that it is unsafe and can result in vapor lock in the wheel cylinders of the brakes.

However, assuming under the previously established conditions that as the heater 24 heats the brake fluid in the chamber 23, the brake fluid boils or otherwise evolves gas from the brake fluid under test in chamber 23 before the temperature indicating arm 19 reaches the minimum limit temperature setting of the arm 18, the gas evolved from the liquid in the chamber 23 will collect in the top of the chamber and the lower level of liquid remaining in the chamber allow the float 31 to drop and thereby open circuit through the mercury tube switch 30. When this occurs, electric circuit will be broken through relay coil 74 and allow the relay to reclose contacts 71 and 72 and ring the buzzer 14 and light the red light 13. Whenever this occurs, the current flow will also be broken to the heater 24 and to the heater 83 whereby the chamber 22 of the sensing device is allowed to cool off as is the temperature indicating device 10. If cooling off of the heat chamber of the sensing device allows the liquid to condense and again refill the chamber 23, circuit will again be made through the contact wires 32 and 33 of the mercury tube switch 30 to re-energize relay coil 74 and open the alarm circuit comprising the buzzer 14 and the red light 13, and re-establish green light circuit as well as heaters 83 and 24.

If the gasification reoccurs, the cycle of operation will be repeated time and again so that the end result is that the temperature indicating arm 19 will float at the temperature at which gasification is occurring in the liquid under test, thereby giving the operator of the apparatus, as well as the operator of the vehicle having the fluid tested, an immediate report on the temperature at which the brake fluid is boiling or vaporizing. Since this is below the minimum temperature established for boiling of a safe fluid, the operator of the vehicle will know that the brake fluid in his brake system is unsafe and should be changed.

Figure 7:
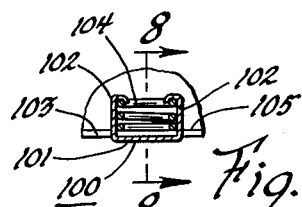
FIG. 7 is a cross-sectional view taken along line 7—7 of FIG. 2.
Figure 8:
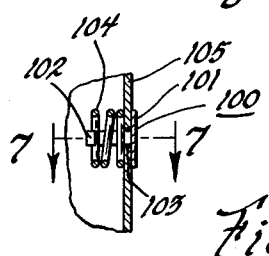
FIG. 8 is a cross-sectional view taken along line 8—8 of FIG. 2.

To provide for an adjustment of temperature indicating device, specifically with reference to the temperature indices 100, the temperature indices are each carried on a slidable plate 101, as more specifically shown in FIGS. 7 and 8 that has tongues 102 extending through the arcuate slot 103 with a coil compression spring 104 between the in-turned ends of the arms 102 and the rear face of the wall 105 so that the indices plates 101 can be shifted to adjust the instrument for original calibration or for recalibration in the event of damage to the instrument.

While the embodiments of the present invention as herein disclosed constitute a preferred form, it is to be understood that other forms might be adopted.

What is claimed is as follows:

1. Apparatus for checking the boiling point of liquids including in combination, means forming a heat chamber adapted to confine a body of liquid therein and confine therein gases evolved from a body of liquid in the said chamber, heating means heating said chamber, temperature indicating means operably connected with said heat chamber and actuated in response to temperature thereof to indicate temperature of said heat chamber, float means in said chamber operating switch means connected therewith, said switch means having electric circuit connection with said heating means and said temperature indicating means to render the same active for heating and temperature indication when closed and inactive when open, said float means actuating said switch to open the same on lowering of liquid level in said chamber resulting from evolution of gas from the liquid contained in said chamber to stop thereby said heating means and said temperature indicating means from further rise in temperature and establish thereby the boiling point of a liquid in said chamber.

2. Apparatus for checking the boiling point of liquids including in combination, means forming a heat chamber adapted to confine a body of liquid therein and confine therein gases evolved from a body of liquid in said chamber, heating means heating said chamber, electric resistance means having resistance change on change in temperature thereof responsive to temperature of said chamber, temperature indicating means electrically connected with said resistance means and actuated thereby in response to temperature change of said chamber, float means in said chamber operating switch means connected therewith, said switch means having electric circuit connection with said heating means and said temperature indicating means to render the same active for heating and temperature indication when closed and inactive when open, said float means actuating said switch to open the same on lowering of liquid level in said chamber resulting from evolution of gas from the liquid contained in said chamber to stop thereby said heating means and said temperature indicating means from further rise in temperature and establish thereby the boiling point of a liquid in said chamber.

3. Apparatus for checking the boiling point of liquids including in combination, means forming a heat chamber adapted to confine a body of liquid therein and confine therein gases evolved from a body of liquid in the said chamber, heating means heating said chamber, electric resistance means having resistance change on change in temperature thereof responsive to temperature of said chamber, temperature indicating means electrically connected with said resistance means and actuated thereby in response to temperature change of said chamber, float means in said chamber carrying switch means operated thereby, said switch means having electric circuit connection with electric relay means, said relay means having electric circuit connection with said heating means and with said temperature indicating means, said switch means having one position to render said relay means active for electric circuit connection of said heating means and said temperature indicating means to render the same active, said switch means having a second position rendering said relay means inactive and thereby effecting electric disconnection of said heating means and said temperature indicating means, said float means being actuated by lowering of liquid level in said chamber resulting from evolution of gas from the liquid contained in said chamber to actuate said switch means and stop thereby said heating means and said temperature indicating means from further rise in temperature and establish thereby the boiling point of a liquid in said chamber.

4. Apparatus constructed and arranged in accordance with claim 3 wherein said temperature indicating means includes means in electric circuit arrangement with said relay means to render the same inactive when a predetermined maximum temperature is reached by said indicating means.

5. Apparatus constructed and arranged in accordance with the apparatus set forth in claim 3 wherein said temperature indicating means includes means in electric circuit arrangement with said relay means to render the same inactive and thereby render said heating means, said temperature indicating means and said electric resistance means inactive upon said temperature indicating means reaching a predetermined temperature indication.

6. Apparatus for checking the boiling point of liquids, including in combination, means forming a closed heat chamber adapted to confine a body of liquid therein and confine therein gases evolved from the body of liquid in the said chamber, heating means engaging said chamber to heat the same, conduit means in liquid flow connection with the bottom of said chamber through which liquid is admitted to the chamber and exhausted therefrom, additional conduit means connected with the top of said chamber including a suction bulb for drawing liquid into said chamber to fill the same, a float member pivotally mounted in said chamber carrying switch means thereon actuated by tilting movement of said float member, temperature indicating means operably connected with said heat chamber and actuated in response to temperature thereof to indicate temperature of said heat chamber, said switch means having electric circuit connection with said heating means and said temperature indicating means to render the same active for heating and temperature indication when closed and inactive when open, said float member having one position with said chamber filled with a body of liquid to close said switch means and render thereby said electric heating means and said temperature indicating means active, said float member having a second position responsive to a predetermined low level of liquid in said chamber to open said switch means to stop thereby said heating means and said temperature indicating means from further rise in temperature and establish thereby the boiling point of a liquid in said chamber.

7. Apparatus constructed and arranged in accordance with claim 6 wherein said switch means on said float member comprises a mercury tube switch provided with a pair of lead wires extending therefrom, bracket means on said float member receiving said lead wires through openings in the said bracket means to form thereby pivot means for the float means utilizing the lead wires of the said mercury tube switch, said bracket means having means for attaching electric wires thereto for conduction of electric current to the said mercury tube switch.

8. Apparatus constructed and arranged in accordance with claim 7 wherein said bracket means includes linearly extending wire spring means engaging the periphery of the said lead wires of said mercury tube switch and cooperating therewith for current conduction to the said switch through the said spring means.

References Cited in the file of this patent
UNITED STATES PATENTS

| | | |
|---|---|---|
| 2,312,307 | Blanchard | Mar. 2, 1943 |
| 2,499,105 | Mercer | Feb. 28, 1950 |
| 2,669,863 | Shapiro | Feb. 23, 1954 |
| 2,765,662 | Feigin | Oct. 9, 1956 |